US006868439B2

(12) United States Patent
Basu et al.

(10) Patent No.: US 6,868,439 B2
(45) Date of Patent: Mar. 15, 2005

(54) SYSTEM AND METHOD FOR SUPERVISING USE OF SHARED STORAGE BY MULTIPLE CACHING SERVERS PHYSICALLY CONNECTED THROUGH A SWITCHING ROUTER TO SAID SHARED STORAGE VIA A ROBUST HIGH SPEED CONNECTION

(75) Inventors: Sujoy Basu, Mountain View, CA (US); Rajendra Kumar, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 248 days.

(21) Appl. No.: 10/117,506

(22) Filed: Apr. 4, 2002

(65) Prior Publication Data

US 2003/0195940 A1 Oct. 16, 2003

(51) Int. Cl.[7] ............................................. G06F 15/167
(52) U.S. Cl. ........................ 709/213; 709/214; 709/216
(58) Field of Search ................................ 709/203, 219, 709/249, 213, 214, 216; 370/389

(56) References Cited

U.S. PATENT DOCUMENTS

| 6,023,726 | A | 2/2000 | Saksena ........................ 709/219 |
| 6,098,064 | A | 8/2000 | Pirolli et al. ................... 707/2 |
| 6,260,061 | B1 | 7/2001 | Krishnan et al. | |
| 2002/0010798 | A1 * | 1/2002 | Ben-Shaul et al. .......... 709/249 |
| 2002/0048269 | A1 * | 4/2002 | Hong et al. ................... 370/389 |
| 2002/0133537 | A1 * | 9/2002 | Lau et al. ...................... 709/219 |
| 2003/0023702 | A1 * | 1/2003 | Kokku et al. ................. 709/203 |

FOREIGN PATENT DOCUMENTS

EP          0877326         11/1998

| WO | WO01/17765 | 3/2000 |
| WO | WO01/42941 | 6/2001 |

OTHER PUBLICATIONS

Last Mile Acceleration: brief discussion of predictive caching (deciding what to prefetch) http://www.fireclick.com/'pdfs/whitepaper_lastmile.pdf.

(List continued on next page.)

*Primary Examiner*—Le Hien Luu
*Assistant Examiner*—Quang N. Nguyen

(57) ABSTRACT

A special-purpose appliance (SPA) works in conjunction with a server farm consisting of multiple caching server appliances (CSAs) to supervise a local storage medium (i.e., a shared cache) that is accessible by all the CSAs for storing at least some of the remote objects such as web pages and their embedded objects and/or streaming media objects that have been and/or will be served by one or more of the CSAs to its respective clients. The SPA preferably also determines when to prefetch remote objects such as web pages and their embedded objects and/or streaming media objects that are not currently stored in the shared cache, but which the SPA has determined are likely to be requested in the future by one or more of the CSAs one behalf of one or more of the CSA's respective clients. In that regard, the SPA (and/or PSA) does not merely monitor the file requests from each CSA to the remote servers, but rather monitors and aggregates the individual requests from each client to its respective CSA, for example, by monitoring the access logs of each CSA and using that data to decide what to prefetch into the shared cache from the remote server or servers, what is still of value and needs to be updated, and what is no longer of value and can be replaced. What it prefetches can be based, for example, on links present in an already requested web page, on patterns of recent accesses to web pages and streaming media objects, on user profiles, and on past trends.

27 Claims, 3 Drawing Sheets

OTHER PUBLICATIONS

PPFS Data Server: a brief discussion of node servers but each client has its own cache and prefetch system http://www-pablo.cs.uiuc.edu/Project/PPFS/History/server.htm.

Top 10 Prefetching: a detailed discussion of prefetching caching http://archvlsi.ics.forth.gr/html_papers/TR173/node6.html.

M. Rabinovich et al—Web Caching and Replication—Addison Wesley Professional—Chapter 11—Replacement Policy and Chapter 12—Prefetching—p. 177–181; p. 183–206 & p. 331–343.

S Paul et al—Distributed Caching With Centralized Control—Computer Communications—Elsevier Science Publishers vol. 24 No. 2—Feb. 1, 2000—pp. 256–268.

D Foygel et al—Reducing Web Latency with Hi rarchical Cache—Based Prefetching—Proceedigns 2000—International Workshop on Parallel Processing Aug. 18 2000—pp. 103–108.

Lin hang et al—An In–Depth Survery on Web Caching—Internet article—"Online!" Apr. 1999—p. 10–23.

* cited by examiner

SYSTEM AND METHOD FOR SUPERVISING USE OF SHARED STORAGE BY MULTIPLE CACHING SERVERS PHYSICALLY CONNECTED THROUGH A SWITCHING ROUTER TO SAID SHARED STORAGE VIA A ROBUST HIGH SPEED CONNECTION

FIELD OF INVENTION

The present invention relates generally to networks having clients served by both remote and local servers, and more particularly to means for supervising shared local storage in which selected objects are cached.

BACKGROUND OF THE INVENTION

Higher bandwidth and lower latency for web and streaming media clients dependent on remote central servers can be accomplished by providing caching servers at more local points in the network that keep copies of files previously retrieved from the remote server for subsequent repeated access by the local clients. Multiple caching servers can be arranged in hierarchical fashion to share a common cache of objects, in effect forming a shared second level cache of objects in response to aggregated requests for files that were not available from a respective server's first level cache. The theory underlying "caching" is that since the same file may be used more than once, it may be more efficient (both in terms of speed and resource utilization) to keep a copy locally rather than retrieve it a second time from a remote source. Typically, each caching server caches a small set of "hot" recently accessed objects in a fast and relatively expensive random access memory attached to its internal bus, and a somewhat larger set of such objects in a slower and cheaper random access peripheral storage device such as a magnetic or optical disk.

An even bigger set of objects can be locally cached in a networked storage medium such as a SAN ("Storage Area Network") or a NAS ("Network Attached Storage") that is accessible by the caching server (and also by other local clients and/or servers) via a relatively short and fast transmission medium such as fiber optic cable that offers higher bandwidth and lower latency than is available from the remote server.

Prefetching is a known technique for analyzing current and/or past file requests to predict what files are likely to be requested in the future, and uses those predictions to retrieve the files from a remote server on a less urgent basis before they are actually requested, thereby reducing not only latency (delay between the request and the response) but also network congestion. It differs from caching in that the focus is not on whether to keep a local copy of a file that has already been retrieved or updated (which is mostly a question of how best to use the available local storage capacity) but rather on whether to obtain from the remote server a file that is not currently available locally and that is not currently the subject of any pending requests (which is mostly a question of how best to use the available transmission capacity to the remote server).

SUMMARY OF THE INVENTION

We propose a new special-purpose appliance (SPA) that works in conjunction with a server farm consisting of multiple caching server appliances (CSAs) to supervise a local storage medium that is accessible by all the CSAs for storing at least some of the remote objects such as web pages and their embedded objects and/or streaming media objects that have been and/or will be served by one or more of the CSAs to its respective clients. In addition to any other responsibilities, the SPA facilitates the sharing of a single cached object by multiple CSAs and determines when a particular object should be replaced with another object of greater potential value to the server farm as a whole. Our highly scalable SPA-based architecture provides multiple caching server appliances clustered with shared external storage in which the number of caching appliances and also the amount of storage for caching can be tailored to the user's needs.

In addition to supervising the caching function of the shared local storage, the SPA preferably determines when to prefetch remote objects such as web pages and their embedded objects and/or streaming media objects that are not currently stored in the shared cache, but which the SPA has determined are likely to be requested in the future by one or more of the CSAs one behalf of one or more of the CSA's respective clients. An SPA that has been enhanced to include such a shared prefetching function is hereinafter referred to a Prefetching Server Appliance (PSA).

In particular, the SPA or PSA does not merely monitor the file requests from each CSA to the remote servers, but rather monitors and aggregates the individual requests from each client to its respective CSA, for example, by monitoring the access logs of each CSA and using that data to decide what to prefetch into the shared cache from the remote server or servers, what is still of value and needs to be updated, and what is no longer of value and can be replaced. What it prefetches can be based, for example, on links present in an already requested web page, on patterns of recent accesses to web pages and streaming media objects, on user profiles, and on past trends.

Each CSA has a dedicated local cache as well as the shared cache common to several CSA's, and may not necessarily access the shared cache each time it receives a file request from one of its clients. Similarly, each access of the shared cache is not necessarily reflected in a corresponding request to the remote server. But because our PSA is capable of accessing the individual access logs of each of the individual CSAs or otherwise monitoring the individual requests of the individual clients, the PSA is able to base its local usage predictions concerning a remote object not only on the limited data available from monitoring the requests for that object from the CSAs to the remote servers and/or the requests from the CSAs to the shared local cache, but also on individual requests for that same object from the clients the CSA services that are satisfied from the CSA's local cache. It is also possible for the PSA to access metadata in the already cached files (such as links to other files, title, author, date last edited or accessed, creation date, and expiration date) and to use that metadata in predicting the extent to which related files (or an updated version of that file) will be requested in the future. The PSA also preferably uses those same combined access logs (and possibly also that same metadata) to determine what to replace from the shared cache when a replacement procedure needs to be invoked for freeing up space in the shared cache for incoming objects from the remote server.

In an alternate embodiment, each client does not request objects directly from a single assigned CSA, but rather routes each such request through a separate Traffic Director Appliance, which in turn determines if any CSA has recently handled a request for that same (or a closely related) object and if so attempts to route the request to the CSA that is best able to handle the request in terms of both experience and available resources. Moreover, if such a TDA capability were integrated with the proposed SPA/PSA, it might be possible for the SPA/PSA to maintain its own consolidated access log of all the client requests independent of any access logs maintained by the individual CSAs.

The proposed SPA/PSA is preferably dedicated primarily for maintaining the shared cache and its internal architecture is preferably optimized for that purpose. This permits each CSA to be optimized for serving its clients from a dedicated local cache and if certain requested objects are not in its dedicated cache, for serving already cached and prefetched copies of those objects from the shared cache, thereby reducing compute and idle cycles during times of peak load that would otherwise be required to get the object from the remote server.

The below-described examples assume a specific architecture and a specific allocation of functionality, using SAN or NAS based storage, but many of the underlying concepts may also be applicable to other architectures and functionalities. In particular, the objects being retrieved may not be URL-identified files, the shared storage may be at a remote location accessible only by WAN and/or shared with other clients and servers at other such remote locations, multiple server and supervisor functionalities may be combined in a single hardware unit, and a single server or supervisor function may be distributed or replicated among more than one hardware unit. Moreover, the skilled artisan, either now or in the future, will presumably be aware of other suitable procedures for determining what and when retrieved objects should be cached and where, which uncached objects should be retrieved even before they are requested, which cached objects should be replaced, and which server should respond to which requests.

DETAILED DESCRIPTION OF THE INVENTION

Figure 1:
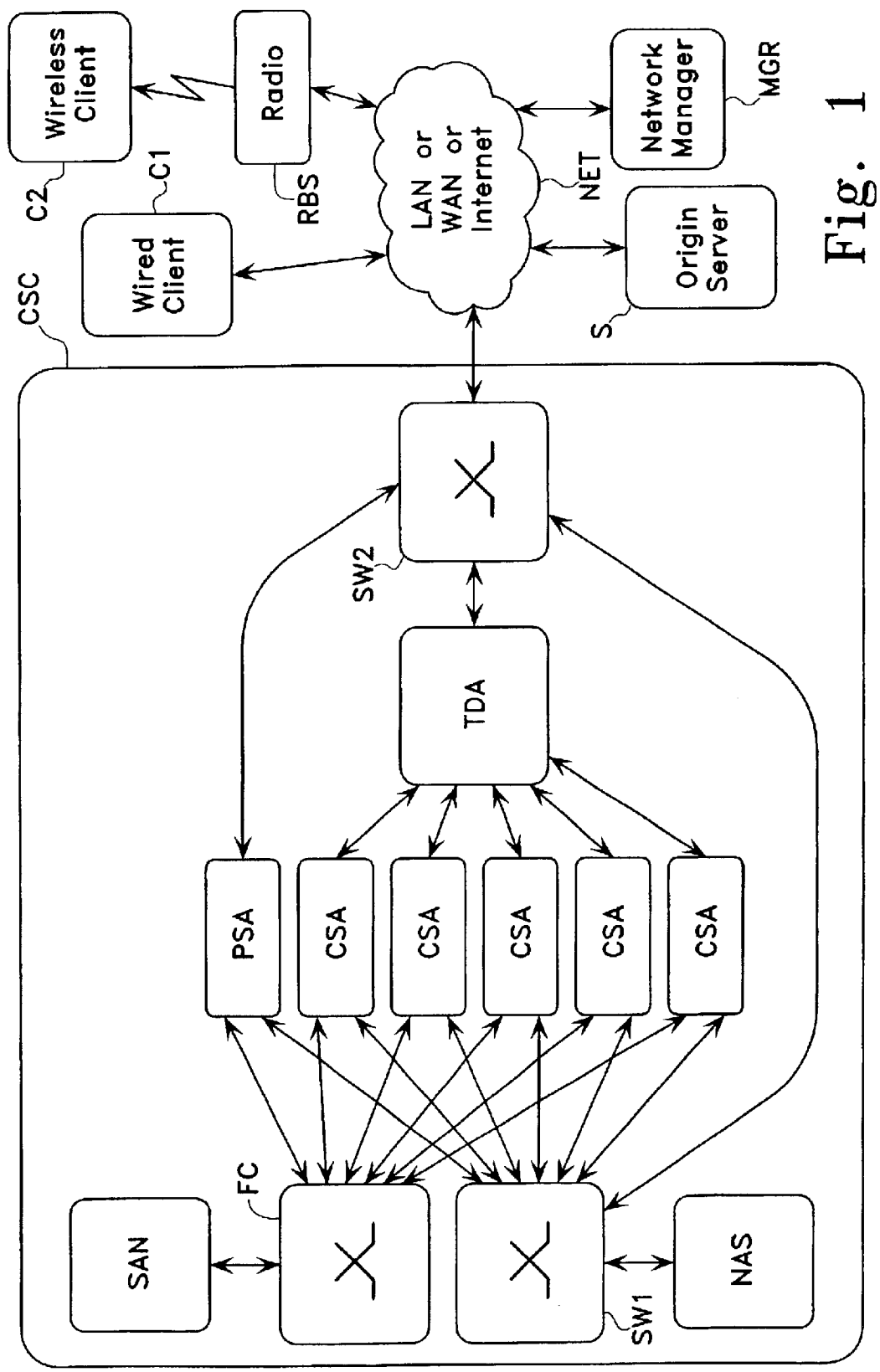
FIG. 1 shows an exemplary Caching Server Complex including a Prefetch Server Appliance and multiple Caching Server Appliances connected either to a Storage Area Network (SAN) and/or to Network Attached Storage (NAS).

As shown in FIG. 1, a Caching Server Complex (CSC) preferably includes multiple caching server appliances (CSAs) as well as a shared prefetch server appliance (PSA) and a Traffic Director Appliance (TDA) which provides a transparent interface and a load balancing function between the CSAs and an external network NET.

It should be understood that although shown as separate functional blocks, some or all of the CSAs, the PSA, and the TDA could be physically integrated into a single cabinet, or even as separate applications running on the same machine. In other embodiments, the PSA may be physically collocated with the storage or it can be in some other location, and/or the TDA functionality could be replaced with individual switched or unswitched connections to the external network NET. In any event, both the PSA and each CSA are physically connected through a switching router (FC or SW1) to the shared local storage (SAN or NAS) via a robust high speed connection (preferably a dedicated channel of a fiber optic network, but possibly a demand based network such as Ethernet).

A second switching router SW2 not only connects the TDA with the external NET, but also preferably provides separate bypass connections from NET to the PSA and also to the NAS (either directly, or via SW1) thereby avoiding any delays that might otherwise be imposed by the TDA. In particular, these bypassed connections would facilitate the downloading (under the supervision of the PSA) of a large volume of prefetched objects into the shared local cache in the NAS. Although not shown, it would also be possible for each of the CSAs to also have a direct connection to SW2 for downloading from the origin servers S without going through TDA.

The PSA, although logically connected to both the shared storage and to the individual CSAs, is preferably physically and logically independent from any one of the CSAs such that the PSA will continue to function even in the event of a failure of any one CSA, and each CSA will continue to function (albeit at a lower performance level) even in the event of a failure of the PSA. However, some of the principles and advantages of the present invention will also be applicable in other embodiments in which the PSA and CSA functionalities are co-located in a single hardware unit, or in which the PSA functionality is distributed or duplicated in more than one hardware unit.

First Scenario: SAN-based System Architecture

At least logically a SAN-based PSA will typically be connected as shown in the upper portion of FIG. 1. In the illustrated embodiment, several CSAs are preferably connected to a SAN through a Fiberchannel switch FC and the PSA is also connected to the SAN through that same Fiberchannel switch. Because only a limited amount of network traffic flows between the PSA and the individual CSAs, that PSA/CSA traffic will typically not be routed through the Fiberchannel switch FC, but rather over the optional switch SW1 (which can be present even without the NAS) or over the TDA and associated switch SW2. As noted previously, the TDA and SW2 are also connected to an external conventional Local Area Network (LAN) and/or Wide Area Network (WAN) NET that connects the individual CSAs to their respective clients (C1, C2) and to one or more remote origin servers (S). In particular, the conventional Local Area Network may be an Ethernet network and the conventional Wide Area Network, may be the Internet, or an Internet-based Virtual Private Network. It will be appreciated by those skilled in the art that other CSAs at other physical locations can have virtually unlimited and instantaneous access to the same shared storage (SAN or NAS) and thus to a much larger cache than would otherwise be practical. However, at least the connections from the individual CSAs to any shared local storage (SAN or NAS) are preferably high bandwidth, low latency connections.

Second Scenario: NAS-based System Architecture

As shown in the lower portion of FIG. 1, all the CSAs and the PSA may be connected to a NAS via a high speed LAN and associated switching router SW1. Alternatively, an existing LAN may be used both to connect the CSAs to each other and also to connect the CSAs to their shared local servers. However, the lack of a dedicated high speed transmission medium between each CSA and their shared local storage could result in a deterioration of performance when such a shared LAN is saturated with other traffic.

CSC Appliance Architecture

Figure 2:
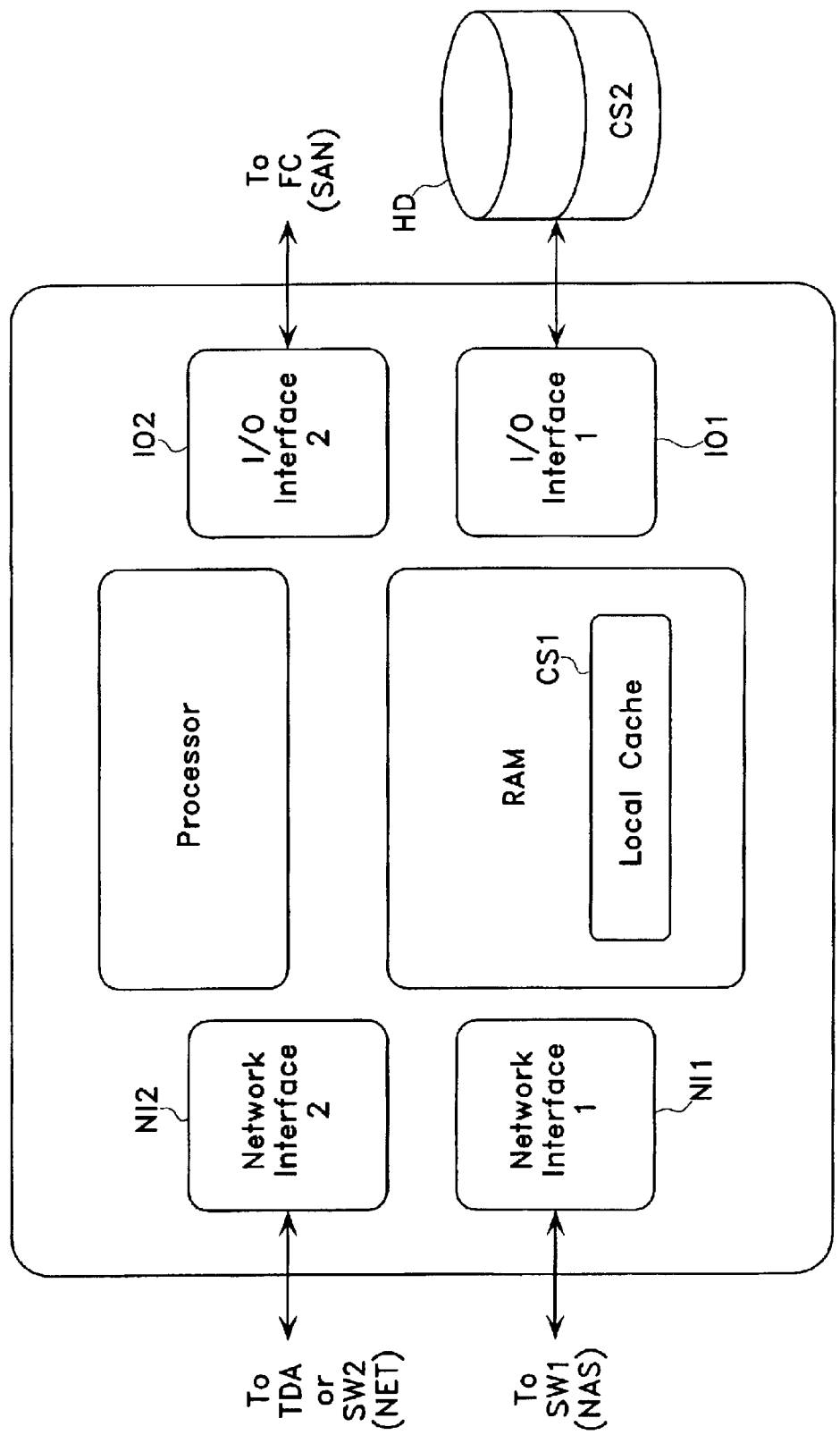
FIG. 2 is an architectural block diagram of a typical Caching Server Complex Appliance.

FIG. 2 is an architectural block diagram of a typical Caching Server Complex Appliance. It includes a processor CPU, high speed random access storage RAM which preferably includes (at least for the CSAs) a first level local cache store CS1, a pair of network interfaces (NI1 and NI2) for connection to respectively SW1 and TDA/SW2 of FIG. 1, a first I/O interface (IO1) connected to local storage HD (typically one or more dedicated hard disks) that is used for server software to control the CPU and for second level local cache storage (CS2) that is typically larger and cheaper but slower than can be included within the available RAM. Although a simplified two level cache architecture (RAM and one attached local drive HD) is shown, those skilled in the art will realize that the dedicated local cache available to the CSA may have more or fewer levels and may include any cacheable content present in the processor caches (SRAM), memory (DRAM) and disk drives (both internal and external disk drives) that are under the direct control of the CSA.

As will be appreciated by those skilled in the art, not all appliances will have all of the hardware components shown in FIG. 2. In particular, the shared cache will typically be either a SAN or a NAS, and only one shared cache interface (NI1 or IO2) will be required for the CSA. Similarly, only the CSA will typically have both a local RAM cache CS1 and a local disk cache CS2, and other CSC appliances may dispense with the need for dedicated external storage over a separate IO interface. Finally, some of the CSC appliances (such as the TDA) may not even need any direct interface to the external shared cache (SAN and/or NAS).

Functionality Common to Both Scenarios

Reference should now be made to Table 1.

TABLE 1

| Object Name | Object Size | Object Usage Count | Object Download time | Object Age | Last Use Time | ... | ... |
|---|---|---|---|---|---|---|---|
| O27 | X | X | x | X | x | X | X |
| O4 | X | X | x | X | x | X | X |
| O2 | X | X | x | X | x | X | X |
| O5 | X | X | x | X | x | x | x |
| O2 | X | X | x | X | x | x | x |
| O3 | X | X | x | X | x | x | x |
| O1 | X | X | x | X | x | x | x |
| O2 | X | X | x | X | x | x | x |
| O20 | X | X | x | X | x | x | x |
| O15 | X | X | x | X | x | x | x |
| O2 | X | X | x | X | x | x | x |

Periodically each CSA generates an access log similar to that shown in Table 1 which contains information about the clients whose requests to origin servers have been proxied by the CSA and served either from its dedicated local cache, from the shared local cache, or from the origin server. For each request, various details such as the URL requested, whether it was already present in the memory or storage (cache hit), the date and time of the access, number of bytes transferred and type of request from the client are placed in the log. The log may be generated by appending the details of requests collected in the CSAs memory to the current file for storing access log. A different file (or, as shown in the Table, a different section of the same file) is preferably used for different time windows for storing the access log of the CSA during that particular time period. The directory structures and file names follow a convention which allows the PSA to read the access logs for all the CSAs, so that it may combine the individual CSA access logs into a similarly formatted consolidated log. Furthermore, the PSA may process access data for different time windows such as last hour, last day, last week and so on to detect access patterns that repeat at the same time every day, every Monday, first working day of a month, and so on.

The PSA also keeps track of the contents of the shared object cache present in the SAN or NAS and is preferably responsible for the management of this shared cache, although at least the caching function could be separately managed by one or more of the CSAs. In particular, if the CSA determines that a file requested by one of its clients is not available from the shared cache, it could initiate a download of that file into its local dedicated cache from the remote origin server, and then as a lower priority background function, transfer a copy of that cached file into the shared cache. However, downloading a requested file from a distant server S over the Internet or other WAN network NET having a relatively high latency and a relatively low bandwidth is slower and more wasteful of computational resources than retrieving the same file from a local storage farm (SAN or NAS) over a LAN or Fiberchannel, and thus even this aspect of the caching function is preferably managed by the PSA. Such a centralized downloading functionality preferably checks for multiple requests for the same file from different CSAs thus making even more efficient use of the limited bandwidth available.

If sufficient free space is not already available to store a newly prefetched file, the PSA (or other entity responsible for managing this aspect of the shared cache functionality) must have some mechanism to decide which objects to replace from the shared cache and when. Two types of information are potentially available to the PSA for this purpose. It can analyze the consolidated access log mentioned earlier for historical usage data such as frequency of access of each object in the cache, or how recently each object has been accessed. Preferably, that usage data reflects not only access of the copy of the file in the shared cache, but also of other copies of that same file in the dedicated caches maintained by each of the caching servers. Other inputs can be metadata of each object accessed such as its size, content type or the expiry time beyond which the validity of the cached object must be verified from the origin server before being served to the client.

If the access logs (Table 1) are updated only periodically, more recent information on access to the shared cache can be obtained from monitoring the actual requests sent from the CSAs to the shared cache. However the access logs provide additional useful information that cannot be obtained merely by monitoring transmissions between the CSAs and the shared cache. For example, once a CSA has transferred a web page from the shared cache into its memory, it can serve multiple client requests from its memory. The simplest way for the PSA to know about the number of accesses to that web page is by processing the access logs maintained by each CSA. Alternately, the information being written into the CSA access log or some subset of it can also be contemporaneously sent by the affected CSA to the PSA in a suitable message format.

Regardless of how it is obtained and where it is stored, the PSA preferably uses this CSA-originated access information to determine when and what to prefetch. Based on analysis of historical access data, it can predict the content that will probably be accessed frequently in the near future. For example, data mining techniques applied to the access logs might reveal that web pages, audio and video archives of the past day's news are accessed heavily from the news.com web site between 7 and 9 AM. To handle these accesses fast, the PSA might issue prefetches for this content between 6 and 7 AM. These prefetches might be generated in a web-crawler which prefetches the top-level pages from news.com and follows the hyperlinks in them, issuing prefetches for each. Similarly, during 12 to 1 PM, there might be frequent accesses to restaurant menus available at waiter.com. So these pages might be prefetched between 11:30 AM and noon. For large streaming media files, it may not be reasonable to prefetch the entire file. In that case, a prefix of the file corresponding to the first few seconds of playing time might be prefetched. This allows a response to a client's request with very low latency. Similarly, if the PSA determines, that most future requests for a video will be for a specific format and resolution, it may prefetch only that instance. These are examples of what are hereinafter referred to as "experience-based" prefetching.

Since the PSA preferably monitors all traffic between the CSAs and the shared cache, it knows when a pending request cannot be satisfied from the shared cache (a so-called "demand miss"). The PSA has access to this information regardless of whether the PSA or the requesting CSA then assumes responsibility for requesting the file from the remote origin server (or other source, such as a downstream proxy or a mirror). Such demand misses result in additional bandwidth utilization over the external network, and thus the PSA preferably responds by reducing its prefetching activity as the number of demand misses (or more properly, as the download bandwidth required to download those requested files not currently stored in shared cache) increases. Thus the prefetch operation should be accorded a lower priority than retrieving a requested file from a remote server in response to a demand miss, and the available system resources will be used more efficiently (and adaptively). Conversely, even if sufficient bandwidth available to perform additional prefetching, it may not always be an efficient usage of those resources to replace already cached files with other files obtained by additional prefetching. For example, if the current demand misses are relatively low (below a certain threshold), the number of objects prefetched (or alternatively the allocated network bandwidth) might even be reduced, since it is unlikely that any additional prefetching would produce a sufficient improvement in performance to warrant the additional effort, and could even result in a deterioration of the effectiveness of the current cache.

By combining experience-based prefetching with "just-in-time" prefetching, the PSA can also provide support for predictive prefetching based on current usage (either a file just recently cached in response to a demand miss, or the first request for a previously prefetched file). Based on review of historical access data, the PSA may determine there is a high probability of accesses to certain related other objects following a request for a particular object and if they are not already present in the shared cache, it issues prefetches for them. In some cases, such related files may be determined in advance from a prior analysis of historical information gleaned from the access logs. In other cases, the other related objects can be ascertained only from the results of current request, for example, hyperlinks to other web pages can be used to initiate a prefetch to those other pages. The latter possibility is an example of pure "just-in-time" prefetching that is based only on current usage, and that therefor could be performed by the CSA handling the current request without any further intervention by the PSA. However, it is possible that the hyperlinked file has already been cached by the another CSA and/or in the shared cache, and therefor some coordination by the PSA is still desirable.

Another possible combination of experience-based with "just-in-time" prefetching is particularly applicable to streaming media files. The historical usage data could prioritize the prefetching of only a certain interval (for example, the beginning of each track), and the current usage data triggers prefetching of subsequent intervals only after the first interval has actually been requested, perhaps as a lower priority background task for the origin server to send the rest of the track. Such an approach would not only reduce the amount of data to be prefetched and the associated local storage required without any increase in latency, it would also improve network performance. Similarly, for large objects, only a small fraction ("chunk") of the object is preferably prefetched (prefix caching). The prefetched amount could be based on the storage capacity of the caching server, the consumption rate on the client side, and the network bandwidth to the origin server. The number of objects to prefetch could also be determined by the expected hit rates. For large expected hit rates, fewer objects with a larger chunk size would be prefetched. On the other hand, for small expected hit rates, more objects with a smaller chunk size would be prefetched.

Exemplary procedures will now be described for determining what files should be cached in the PSA, what already cached files in the PSA should be replaced, what files should be copied from the CSA to the PSA, and (optionally) how to associate a suitable CSA for each client request.

Exemplary Prefetching Procedure

Step 1

Analyze access logs written by the CSAs (both from the proxy cache and the streaming media server) with techniques such as OLAP, data mining and standard SQL queries to a relational database. This will require transforming the content from the access logs into the format required by these techniques. For example, a SQL query to a relational database will require that the content of the access logs be added to the appropriate relational tables in the database.

Step 2

Using the CSA access log data, create a table which gives content access variations with time-of-day for a weekday or Saturday or Sunday:

| Time Interval | List of URLs |
| --- | --- |
| 7 am–10 am | URL1, URL2, URL3, . . . |
| 10 am–1 pm | URLa, URLb, URLc, . . . |
| 1 pm–5 pm | URLx, URLy, . . . |

The table lists, for different times of day, the content that was accessed with a frequency greater than some threshold. To create this table for a weekday, all entries in the access logs for weekdays could be considered for the previous week, previous month or several months. Whether to consider the previous week or previous month will depend on feedback of how accurate the prefetch is for each case.

Step 3

The CSA access log data may also be used to identify association rules which could be in formats such as:

A, B, C, D→E According to this rule, if the client has requested URLs A, B, C and D, it is highly likely that the next request will be for E. So E is a good candidate for prefetch.

(W, X) (U, V, Y, Z) According to this clustering rule, there is a strong correlation between accesses to W and X. So if either is requested by the client, the proxy should consider the other as a candidate for prefetch. Similarly if any one of U, V, Y and Z is accessed by the client, the proxy should consider the other 3 as candidates for prefetch.

These rules are not exhaustive. Others will be evident to those skilled in the arts mentioned in step 1.

Step 4

Create a table that indicates activity during different hours of the day:

| Time Interval | Requests per second |
|---|---|
| 4 am–7 am | 0.1 |
| 7 am–10 am | 5.5 |
| 10 am–1 pm | 2.1 |
| 1 pm–5 pm | 1.3 |
| 5 pm–7 pm | 6.1 |
| 7 pm–10 pm | 3.1 |

This table may be prepared for the PSA serving a certain region by analyzing, the access logs of the associated CSAs. For each time interval, the average is obtained for the number of requests per second. This gives an estimate of the traffic from the clients in that region.

Step 5

The activity level table from Step 4 may be used to schedule prefetches during time intervals such as 4 am to 7 am, when requests per second is low and hence network traffic is low. The content to be prefetched is determined by the usage table in Step 2. The prefetch is issued only if the content is not already present in the SAN or NAS. Depending on the storage capacity of the PSA and attached SAN or NAS devices, only a subset of the URLs for that time interval could possibly be prefetched. In that case, the URLs could be prioritized based on criteria such as the average expected latency of the origin server for that URL. This criterion could be evaluated based on the access logs, or it could estimated based on number of network hops to the origin servers. More network hops would imply higher latency.

Step 6

In addition to the scheduled prefetches, just-in-time prefetching could be done using the rules derived in Step 3. This might be done more efficiently if the rules are communicated to the CSAs by the PSA. Then if a CSA gets a request for URL X, it can check, in accordance with the clustering rule of Step 3, whether the associated URL W is present anywhere in the storage hierarchy. If not, it can send a request to origin server of W. If the round-trip latency from CSA to origin server is A milliseconds, and request for W from client comes to CSA after B milliseconds, client will witness only (A–B) milliseconds of this latency if A>B, and none if B>=A.

Step 7

In either Step 5 or Step 6, if the URL to be prefetched is streaming media (such as MPEG file) rather than static content (HTML text with embedded images), then it should be treated as a special case since the user experience is different. For static content, the entire content is downloaded and presented as a single page view to the user. For streaming media, the user can pause, abort, stop or fast forward. These VCR-like controls are communicated to the streaming media server running on the CSA. The server generates an access log. Using the techniques in Step 1, we can identify what segments of the streaming media is frequently watched. For example, people might watch the first minute of a news broadcast to get the headlines and then fast forward or index into the business or sports sections of the news. Accordingly, we can cache the first few minutes, and the business and sports sections. If a client seems to be watching beyond the first minute, there is a possibility that he will continue. In that case, just-in-time prefetches may be issued by the CSA for subsequent segments of the news broadcast as the client continues watching.

Step 8

For just-in-time prefetches, either in Step 6 or 7, the content is preferably prefetched by the CSA and placed in its local disk initially while the client is serviced. Subsequently, in the background, the CSA registers the already prefetched content with the PSA, and the PSA responds by indicating the location on the SAN or NAS storage device where the CSA should copy ("writeback") the already prefetched content.

Exemplary Replacement Procedure

The PSA periodically evicts content from the shared cache in the SAN and/or NAS devices. The replacement procedure preferably has some tunable parameters:

H is the higher threshold for disk space utilization by the shared cache.

L is the lower threshold for disk space utilization by the shared cache.

V is the value of the URL. The idea is to retain more valuable content in the cache, and may be based on frequency of access, time of most recent access, time left for expiration (as set by the origin server), and/or hybrid parameters such as GDSF, and is preferably determined by periodic access of the CSA access logs (or the TDA URL table, if the below-described TDA function is implemented).

Suppose H is 95% and L is 85%. As soon as the shared cache occupancy reached 95%, this replacement procedure will run, and will keep evicting content from the shared cache until the cache occupies less than 85% of the available space. By tuning H and L, the frequency with which the replacement procedure runs and the amount of work done in each run can be controlled.

The replacement procedure preferably keeps most of the URLs present in the cache in a list (or more efficient data-structure such as heap, which serves this purpose) ordered by V, so that the potential candidates for replacement can be selected quickly.

The replacement procedure preferably skips those URLs which are locked in the cache for expected use later in the day. Locking is done in connection with prefetches scheduled when network traffic is low (such as during 5 to 7 am), for which the content is expected to be heavily utilized during a predictable subsequent busy period (7 to 10 am). The scheduled prefetch could lock the URL until the expected termination of the period of heavy use (10 am). Alternatively, it could be locked until shortly after the expected beginning of the heavy usage period (say 8 am). In that case, if the prefetch prediction is accurate, there will be enough accesses by 8 am to ensure that it will not be replaced as long as it remains heavily accessed. However if the prefetch turns out to be a misprediction, after 8 am, the URL will get evicted. Since the replacement procedure has to skip the locked URLs, those locked URLs are preferably maintained in a list separate from the list L and are added to list L only after they have been unlocked and are possible candidates for eviction.

In each run, the replacement procedure performs as follows: Starting with the URL on list L with the lowest value V, URLs are deleted from the cache one by one, until the disk space utilization falls to the lower threshold L.

Exemplary Writeback Procedure

The previous procedure explains how space is freed up in the SAN and/or NAS devices by the PSA. Some of this space will be used by the PSA when it does the scheduled prefetches. Recall however that there will be some additional prefetches, of the just-in-time category, as well as cache misses. For both of these categories, it may be preferable for the CSA rather than the PSA to contact the origin servers and bring the content into its local disk and memory. However, at least some of that prefetched content will merit saving to the shared cache (SAN/NAS) so that other CSAs in the server complex can serve the same content without suffering a cache miss, and accessing the origin server, and/or so that the requesting CSA can free up it limited local cache storage for "hotter" (higher V) URLs. This is done by the writeback procedure. A simple writeback procedure could be:

Step 1

The CSAs occasionally exchange the table of contents of their caches among themselves.

Step 2

If a CSA A receives a request from a client for some URL, that is not present in its cache, but is present in the cache of another CSA B, then CSA A can request the content from CSA B, just as it would have requested from some origin server. CSA B will be able to send the content to CSA A will lower latency.

Step 3

After sending the content to CSA A, CSA B enters the URL, its location on its local disk, and the size of the content in a table.

Step 4

Periodically CSA B sends this table, to the PSA

Step 5

The PSA sums up the size column of the table and ensures that the required amount of storage is present in the shared cache. This might require running the replacement procedure ahead of its scheduled time.

Step 6

The PSA then maps each URL to a file name in the shared cache, and sends back a table mapping the URLs to file names back to CSA B.

Step 7

CSA B can then copy the content of each URL to its corresponding file name in the shared cache (SAN/NAS).

Step 8

Updated table of contents of the shared cache is periodically sent by the PSA to all the CSAs so that subsequent requests by a client to any CSA for shared content can be satisfied by the CSA from the shared cache without sending a message to either origin server or the other CSAs.

Exemplary Traffic Direction Process

A server farm consisting of multiple CSAs and a PSA may also have another server appliance, known commonly as load-balancer or traffic director appliance (TDA), that organizes the CSAs as a pool, rather than as each dedicated to certain assigned clients, and directs requests from all the clients in the pool to the CSAs, using a predetermined assignment procedure (typically a simple round-robin or random assignment), so that the load on the CSAs are balanced. The TDA preferably is incorporated in the PSA and exploits any previously known affinity of each URL to the CSAs that may have served it recently. Such an affinity-based TDA may be implemented as follows:

Step 1

The PSA maintains a large table, such as a hash table, which allows fast lookup of URLs to determine whether any client has previously requested it, and if so, which of the CSAs was forwarded the request. The last N different CSAs involved in such forwardings can be remembered in the table, where N is typically small, say 3.

Step 2

Upon receiving a client's request, the TDA uses the URL to search the table. If there is an entry, the implication is that at least 1 and possibly N or more previous requests were forwarded by the TDA to CSAs for the same URL. Assuming these CSAs are sorted by time of the forwarded request, the TDA can forward the current request to the CSA which got most recent previous request for the same URL. This CSA is most likely to still have the URL contents in its local cache.

Step 3

However if this CSA has higher than average load currently, its response time might be poor. In that case, the TDA can sequence through the list of at most N associated CSAs from most recently involved to least recently involved, and select the first CSA whose current load will allow it to accept the current request.

Step 4

In case no appropriate CSA is found, or if the table does not have an entry for this URL, then a default TDA procedure, such as round-robin or random assignment, is followed.

Step 5

The table is updated. A new entry is created for the URL if none is present. Also the CSA chosen for the current request is added (or its existing entry is updated) as the most recently requested for this URL. If N other CSAs are already on the list, then the least recently requested CSA is dropped from the list.

It will be obvious to those skilled in this art that such a traffic direction procedure will minimize the amount of data copied from the shared cache (SAN/NAS) to the local disks of multiple CSAs and also the amount of data written back in the opposite direction by the Writeback Procedure. This is because the Traffic Direction Procedure will try to ensure that the same CSA or the same small set of CSAs service all client requests for the same URL, to the extent possible under varying load conditions of the CSAs.

It will also be obvious to those skilled in this art that the above will also minimize the latency with which requests are served to the clients. Any request that is served from the CSA's local cache takes less time than one that requires fetching the data from another CSA or the shared storage (SAN/NAS). This TDA procedure thus tends to ensure that the local cache has the content more often.

Application Programmers' Interface

Figure 3:
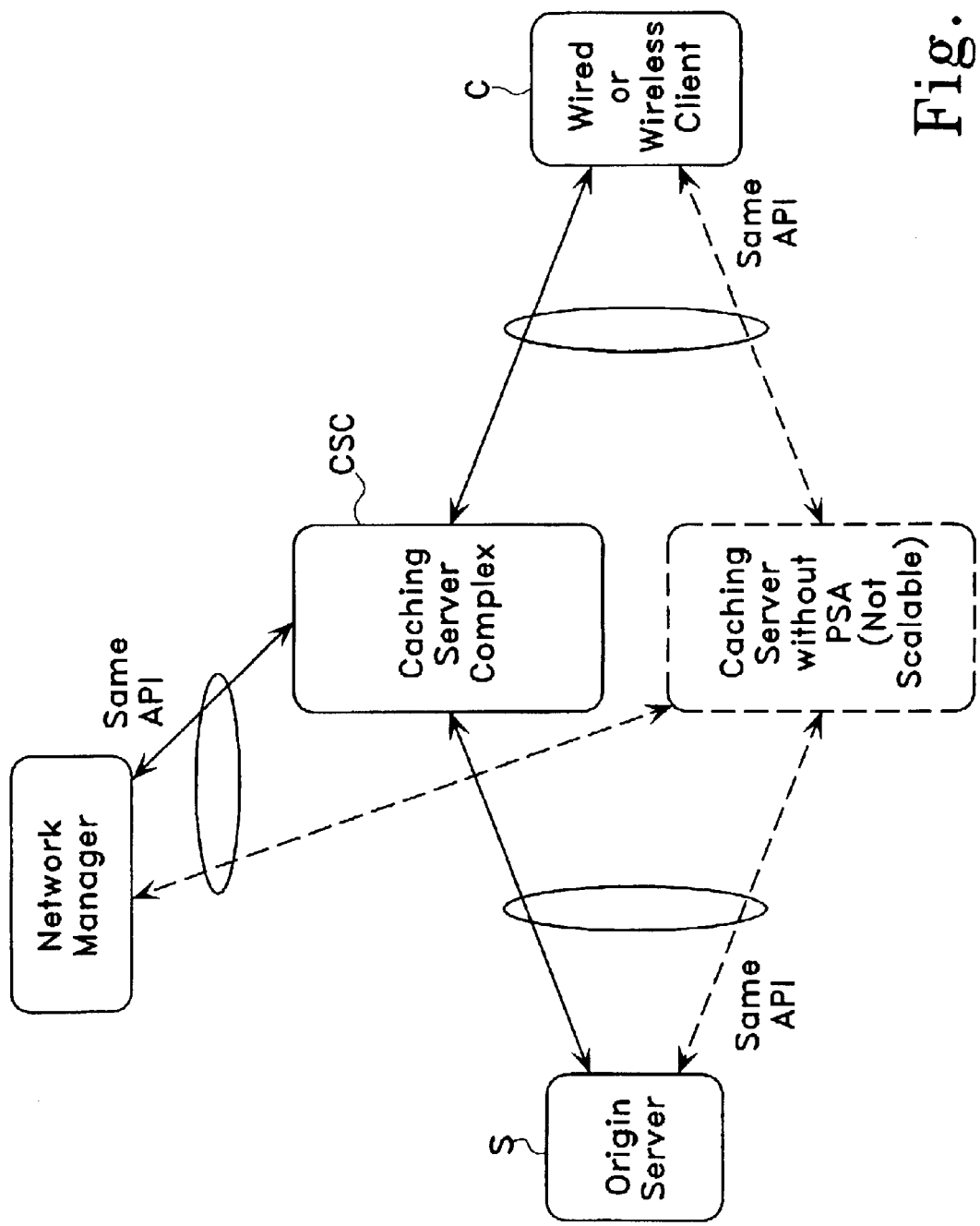
FIG. 3 shows how the same Application Programmer Interface (API) may be used for either a single CSA or for a Caching Server Complex including multiple CSAs.

Similar to existing proxy caches, the CSC preferably also has a shared Application Programmers' Interface (API) which allows the CSC's behavior (in particular, repeated access to the same cached file by multiple users, or downloading of a file that has not yet been requested) to be controlled by the organization owning the content of the cached data. This shared API functionality is preferably included in the PSA/TDA, and provides, as shown in FIG. 3, APIs to the Network (NET), the Origin Servers (S) and the Clients (C1, C2) that are transparent replacement for similar API functionality that would be included in a conventional non-scalable, single CSA configuration. But because the PSA-based CSC services multiple CSAs from a shared cache (NAS or SAN), additional API functionality is contemplated. For example, an agreement with the news.com web site owners might allow only certain types of content to be pushed through the PSA's API to the SAN or NAS, ready for an anticipated peak load between 7 and 9 AM. Multiple PSAs attached to different SAN or NAS storage devices may or may not be allowed to request content from one another without going to origin servers. The API may allow certain clients to issue prefetched requests in the background for other content and to have that other content requested and monitored by the PSA without being forced to download (and pay for) the prefetched content even if it is never used. Since the PSA analyzes the CSA access logs, the API may also be designed to provide support for networking monitoring entities requesting access statistics for the CSA farm, either in the form of a simple download of the CSA access logs, or as aggregated and filtered information generated by the PSA. The API might also allow the network monitoring entities to send information to the PSA on "hot" content currently being downloaded or prefetched elsewhere in the network, as well as information concerning the perceived load on different instances of a replicated origin server and/or the perceived latency of different network paths, to thereby enhance the PSA's performance.

CONCLUSION

Supplementing multiple local caching servers (CSAs) with a shared supervisor (SPA) preferably having prefetch capabilities (PSA), load management (TDA) and transparent external interfaces (API) can provide even greater bandwidth, lower latency, and more efficient use of available storage than would be possible with just the CSAs, especially if the SPA/PSA is provided with access to information concerning all requests from each CSA client.

What is claimed is:

1. A caching system for local storage of objects originating from one or more remote origin servers, comprising:
   a cluster of caching server appliances for retrieving objects requested by clients from a storage hierarchy of sources including dedicated local storage, shared local storage, and remote servers, and for retaining cached copies of selected said objects in said dedicated local storage and said shared local storage, wherein said caching server appliances are physically integrated;
   said plurality of dedicated local stores, each associated with a respective said caching server appliance for providing a respective said dedicated local storage to said respective caching server appliance;
   said shared local store accessible to all said caching server appliances for providing said shared local storage, wherein said caching server appliances are physically connected through a switching router to said shared local store via a robust high speed connection; and
   a supervisor appliance responsive to all object requests from said clients for determining when a particular object stored in said shared local store should be replaced with another object.

2. The system of claim 1, further comprising
   a shared prefetching server appliance capable of anticipating at least some future requests from more than one of said clients, wherein the supervisor appliance replaces selected objects in the shared local store based at least in part on said anticipated future requests.

3. The system of claim 2, wherein
   the shared prefetching server appliance anticipates at least some of the future requests by monitoring all the past requests from said clients.

4. The system of claim 2, wherein
   the shared prefetching server appliance anticipates at least some of the future requests by monitoring predetermined expiration dates of objects stored in said shared local storage.

5. The system of claim 2, wherein
   the shared prefetching server appliance anticipates at least some of the future requests by examining the objects stored in said shared local storage for links to other objects.

6. The system of claim 2, wherein
   the shared prefetching server appliance monitors the requests received by all of the caching server appliances from their respective clients for objects in the shared storage that are being requested only infrequently.

7. The system of claim 2, wherein
   the shared prefetching server appliance replaces those objects with other objects that are being requested more frequently.

8. The system of claim 2, wherein
   the shared prefetching server appliance is integrated with one of the caching server appliances.

9. The system of claim 2, further comprising
   a traffic director appliance.

10. The system of claim 9, wherein
    the traffic director appliance routes the client requests to a selected caching server appliance based at least in part on prior requests for the same object.

11. The system of claim 9, wherein
    the supervisor appliance monitors said requests based on information received from said traffic director appliance.

12. The system of claim , wherein
    a single conventional origin server API is provided between each of said origin server and said cluster, thereby providing the origin server with a single virtual caching appliance.

13. The system of claim 1, wherein
    a single conventional origin server API is provided between each of said clients and said cluster, thereby providing the client with a single virtual caching appliance.

14. The system of claim 1, wherein
    a single conventional origin server API is provided between an external network manager and said cluster, thereby providing the network manager with a single virtual caching appliance.

15. The system of claim 1, wherein
said shared local store is part of a storage area network.

16. The system of claim 1,
wherein said shared local store is network attached storage that is connected to the caching server appliances by a local area network.

17. A method for caching objects originating from one or more remote origin servers, comprising:
   retrieving at least two different objects requested by at least two different clients from remote servers;
   caching first copies of each of two different retrieved objects in respective different local stores of different caching server appliances of a cluster of caching server appliances, wherein said caching server appliances are physically integrated;
   caching second copies of the two different retrieved objects in the same shared local store, wherein said caching server appliances are physically connected through a switching router to said shared local store via a robust high speed connection; and independently determining when each of said first and second copies should be replaced with other cached objects.

18. The method of claim 17, wherein the second copies are placed in the shared storage when the caching server appliances periodically do a write-back of the first copies in their local cache.

19. The method of claim 17, further comprising analyzing past requests from said at least two clients to anticipate at least some future requests from said clients and, using said anticipated future requests to determine when the cached second copies in the shared store should be replaced.

20. The method of claim 19, wherein all the past requests from said clients are monitored.

21. The method of claim 17, wherein predetermined expiration dates of objects stored in said shared local store are monitored.

22. The method of claim 17, wherein the objects stored in said shared local store are monitored for links to other objects.

23. The method of claim 17, wherein all the requests from said clients are monitored for objects in the shared store that are being requested only infrequently.

24. The method of claim 23, wherein objects in the shared store that are being requested only infrequently are replaced with other objects that are being requested more frequently.

25. The method of claim 17, further comprising routing a client's request for a particular object to a server associated with a particular said dedicated local store based at least in part on prior requests from another client for that same object.

26. The method of claim 17, wherein a single common origin server API is used for all said requests to a given said origin server.

27. The method of claim 17, wherein a single common client API is used for all requests from a given said client.

* * * * *